May 7, 1963 S. A. SCHERBATSKOY 3,089,030
OPERATION OF PIPELINES
Filed April 4, 1956
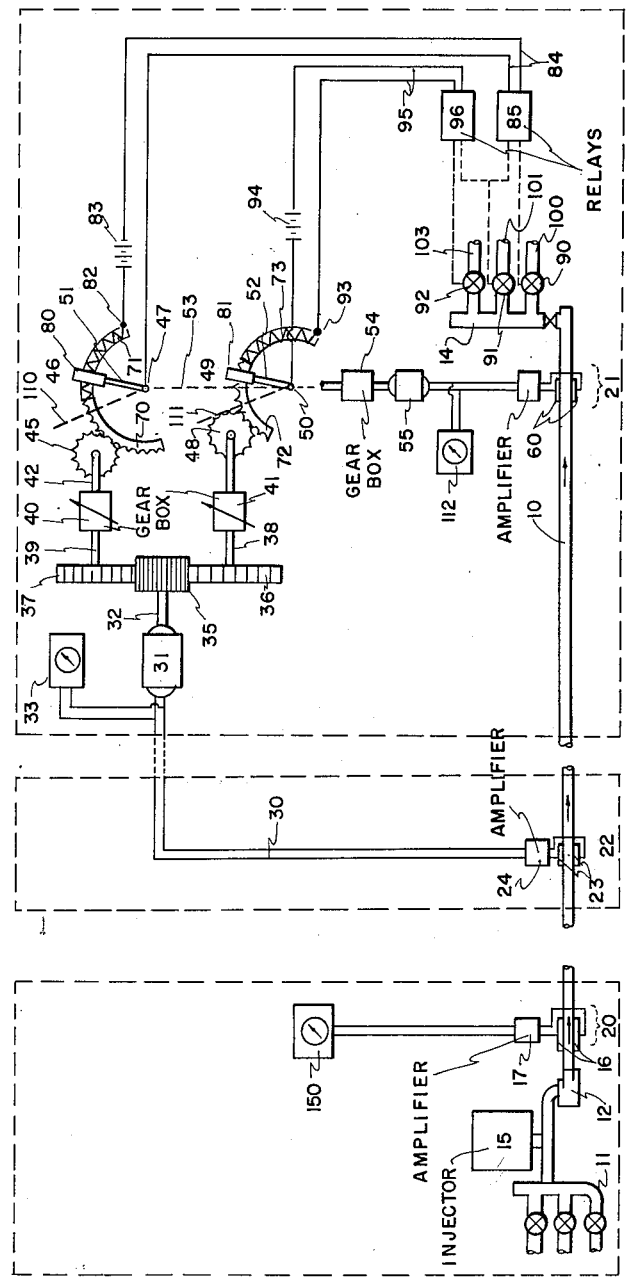
INVENTOR.
Serge A Scherbatskoy United States Patent Office 3,089,030
Patented May 7, 1963

3,089,030
OPERATION OF PIPELINES
Serge A. Scherbatskoy, 804 Wright Bldg., Tulsa 3, Okla.
Filed Apr. 4, 1956, Ser. No. 576,059
5 Claims. (Cl. 250—43.5)

This invention relates to the operation of pipelines employed to transport fluid substances, and in particular to a method and the apparatus for determining the position of an interface between successive adjacent quantities of different materials being transported through the line and the characteristics of the intermixing of the substances in the region of the interface.

The principal objects of this invention are: to provide a means for marking an interface between sequential quantities of fluid substances in a common pipeline; to provide a method for determining the position of such an interface without disturbing the flow of the substances through the pipeline or withdrawing any of the material therefrom; to provide a means for determining the amount of contamination of one substance by another adjacent one in the region of intermixing of substances successively placed in a common pipeline; to provide a method for diverting as desired known substances from the pipeline without contaminating such substances as are diverted with other adjacent substances flowing through the common line; and to provide a method for diverting as desired from the common pipeline known substances containing only predetermined portions of other adjacent substances as contaminants. Other objects will be obvious, or will become apparent, as the description proceeds.

To accomplish these objects, the invention comprises the use of a radioactive tracer material which is injected into a pipeline at the interface between two substances which have been placed therein in sequential adjacent relationship. A tracer material is employed which will have the proper characteristics to intermingle readily with the substances in the pipeline and which will be carried in the interface and distributed throughout the region thereof as the interface merges into the adjacent substances, in varying degrees in accordance with the manner in which the adjacent substances intermix due to conditions of flow or other peculiarities of pipeline operation. Appropriate instruments are provided for detecting the radioactivity of the tracer material. Provision is made for using the radiations from the radioactive tracer to cause a signal to be actuated in a station or a depot on the pipeline prior to the arrival of the interface at that point to permit the operators of the station to be prepared to receive a new substance and handle it as required.

To aid the disclosure of the inventive concept, one sepecific embodiment of it will be illustrated and described.

The attached drawing is a diagrammatic representation of a petroleum products pipeline together with the concomitant apparatus employed in this invention.

The attached drawing represents this invention as applied to a petroleum products pipeline 10 which is designed to receive various predetermined quantities of different petroleum products from their respective storage tanks through a manifold arrangement 11. A pump 12 is employed which receives the products from the manifold on its suction side and discharges such products from its compression side into the pipeline, and forces them thence through the line. The pipeline may extend a distance of several hundred miles, and have various stations located along its length where products may be diverted from the line for use in that area. At a terminal station represented by the numeral 21, provision is made for segregating different products through a manifold 14 to appropriate tanks.

Since the different petroleum products are transported sequentially under continuous flow conditions in a common pipeline, it is important to distinguish the boundary between adjacent products so that upon arrival at the terminal of the pipeline the various different products may be diverted and segregated in their respective tanks with a minimum amount of contamination from other adjacent products. This problem becomes complicated in longer pipelines where, due to the conditions of flow or pipeline operations, the products will have intermixed to some unknown degree at the region of the interface. In those cases where some contamination is allowable, it is necessary to know the varying degrees of intermixing that has occurred so that the cut between the products can be made at the proper point to produce the maximum amount of usable product and the least amount of product that must be downgraded or reworked.

Formerly two methods have commonly been used for this purpose; the measurement of density change by a gravitometer and the observation of color change by a colorimeter. Neither method would work in all cases. Both methods entail either the withdrawal of samples from the products flowing through the pipeline or the by-passing of a portion of the stream of products to instruments for detecting changes therein. In each case a delay ensued between the time the change of products actually took place in the pipeline and the time such change could be measured. During the delay period, the region sampled continued to flow along the pipeline from the point where the samples were taken, and if the delay were prolonged, the region may have passed sufficiently beyond the diversion point to make it difficult or impossible to divert the flow from the pipeline at the optimum time. The present invention overcomes these difficulties by the use of a radioactive tracer, the presence and quantity of which can be detected instantly through the wall of the pipe. Thus, the operator can obtain an instantaneous and precise determination of the position and characteristics of the critical region.

The tracer may be injected into the pipeline at any point where it can conveniently be placed at an interface between the products therein. One such point is a location between the suction side of the pump and the manifold through which new products are introduced into the line. At this point, the tracer may be injected into the line at the time a new product is cut into the stream. Numeral 15 represents an injector located in such a position. It is desirable to make the injection rapidly so that it will enter the interface region substantially as a slug of material.

The radiations from the tracer material may be detected by a Geiger tube, scintillation counter or other appropriate detector, which may be placed within the pipe or adjacent an outside wall of an exposed portion of the pipeline. The detector is connected to appropriate apparatus for indicating and recording radioactive material. The detector station comprises a Geiger tube 16 mounted upon the pipe and connected to a preamplifier 17. Obviously, the Geiger tubes and the related apparatus will be connected to an appropriate source of power.

As illustrrated, a plurality of detector stations are set up along the pipeline at predetermined positions. The first detector station in sequence, designated by the numeral 20, is positioned at the first pumping station. Its specifiic location may be at, although it is not limited to, the discharge side of the pump. At this position the intensity of the radioactive tracer injected into the pipeline from the injector 15 can be initially determined. From the data obtained at station 20, the quantity of radioisotope deposited in the pipeline may be determined for future reference.

The second principal detector station may be located at the terminal point of the pipeline, on the upstream side of the manifold as represented by the numeral 21. Here the approaching interface region will be detected and measured, and the proper provision made to divert the incoming products as required.

When a heart cut is to be taken from one of the products passing through the pipeline, it is necessary for the station operator at the terminal point to know only when the interface region preceding the product has passed the station so that the cut can be taken from the uncontaminated portion of the product. A principal detecter station arrangement will suffice for this purpose. However, when the full quantity of a particular product is to be diverted from the pipeline, or when the different products are to be segregated into their respective tanks, as at the terminus of the line, it is desirable for the station operator to be informed of the imminent arrival at his station of the interface region between products, and to obtain an indication of the conditions of intermixing between the adjacent products, so that he may be prepared to divert the various products at the optimum time.

To accomplish this, an auxiliary detector station is placed on the pipeline at a position upstream of the diversion station. Such an auxiliary station is indicated by the numeral 22. The auxiliary station is desirably placed a distance from the principal station greater than the length of the intermixed region between adjacent products. The auxiliary station comprises a radiation detector, which may be a Geiger tube as in the principal station, mounted adjacent the pipeline and connected to appropriate instruments to indicate the radioactivity in the pipeline products passing that point, and with provision to transmit such information ahead to the principal station. In the specific embodiment illustrated, Geiger tube 23 is mounted on the outside wall of the pipeline and connected to a preamplifier 24 and all at the location of the auxiliary station.

With this knowledge, the operator of the station will be prepared for the arrival of the new product, and will have prior information of the degrees of intermixing throughout the interface region. When the radioactive tracer is picked up by the detector and associated instruments at the principal station, at a time which can be predicted from the known rate of flow of the products and the distance of the principal station from the auxiliary station, the operator will have available sufficient information to make the optimum cuts of the products.

The counting rate meter at the auxiliary station permits the variation in radioactivity to be determined by an operator at that specific locality, if desired. It is contemplated by this invention that other means than a recording instrument can be used at the principal station to inform the operator there of the arrival of the interface region at the auxiliary station, and also that signalling means, such as lights, bells, and the like can be used separately or in addition to the recording instrument. Also, it is contemplated that information from the auxiliary station can be transmitted to the principal station by other means than wire, as, for instance, by radio.

There are three general requirements which are desirable in a radioisotope to be used successfully as a tracer in pipelines:

(1) It should emit penetrating gamma rays.

(2) It should have a half life at least comparable with the duration of its time of travel through the pipeline.

(3) It should be present in a stable compound which will intermix readily with the products in the pipeline.

One isotope which meets these conditions is barium-140. This isotope has a half life of 12.8 days and emits beta rays along with 0.5 m.e.v. gamma rays. The product of disintegration is lanthanum-140, which also is radioactive with a half life of 40 hours, and which emits a gamma ray of 1.6 m.e.v. It is the lanthanum gamma ray which contributes most to the detection of the tracer by a detector placed outside of the pipe.

The barium isotope can be obtained from the fission of a heavy element in an atomic pile. To make a tracer material suitable for use in a petroleum products pipeline, the radioactive barium may be converted to an oil-soluble compound, an alkyl phenate which can be dissolved in oil. The oil solution may be used as a tracer material.

Another isotope suitable for this purpose is antimony-124. A suitable compound in which to incorporate the antimony for tracer use in petroleum products pipelines is triphenylstibine. The compound may be synthesized from irradiated antimony metal, or the compound may be made from nonradioactive components and then irradiated in an atomic pile. Under the latter conditions the compound partially decomposes, but the irradiated samples are treated with hydrocarbon solvents, an appreciable percentage of the radioactive antimony may be exteracted in the form of the original compound. The solution thus obtained is stable to air, water, and to dilute acids and bases and does not leave a significant deposit on the walls of the injector apparatus or the pipelines after long periods of contact. The radioactive triphenylstibine can be dissolved in an oil carrier to make a fluid tracer material.

As the radioactive tracer passes through the auxiliary station 22, the Geiger counter 23 will produce counts, the rate of occurrence of said counts being proportional to the intensity of radiation emitted by the tracer at any instant during its travel and the total number of said counts being proportional to the total amount of the radioactivity detected by the counter 23 as the interface passed through said auxiliary station.

The output of the counter 23 passes through the amplifier 24 and is subsequently transmitted by means of leads 30 to the principal station 21 wherein it is applied to an electromechanical transducer 31 provided with an output shaft 32 and operating in such a manner that the angular displacement of the shaft 32 is proportional at any time to the total number of pulses applied to the input terminals from a certain initial instant. The leads 30 are also applied to an indicator 33 which shows the total number of pulses applied to the leads from said initial instant.

The shaft 32 is engaged through gears 35, 36, 37 to the shafts 38 and 39, said shafts 38, 39 being in turn applied to the gear boxes 40 and 41, respectively. The gear boxes 40, 41 are controllable so that speed reduction can be controlled and determined in advance. It can therefore be arranged so that the speed of rotation of the output shaft 42 will be equal to $\frac{1}{10}$ of the speed of the input shaft and the speed of rotation of the output shaft 43 will be $\frac{9}{10}$ of the speed of the input shaft.

The shaft 42 is adapted to rotate through the gear 45 a semicircular segment 46 of a rotary switch, said segment being rotatable around the point 47. Similarly, the shaft 43 is adapted to rotate through the gear 48 a semicircular segment 49 of a rotary switch, said segment being rotatable around the point 50.

The two rotary switches have respective wiper arms 51, 52, each mounted on and insulated from a driving shaft 53, said driving shaft being turned through the gear box 54 by an electromechanical transducer 55. The transducer 55 is similar to the transducer 31, i.e. it is arranged to rotate the output shaft 53 in such a manner that the total displacement of said shaft is equal at any time to the total number of impulses that were obtained from the output of the Geiger counter 60 positioned at the terminal station 21.

The semicircular segment 46 comprises a portion 70 which is non-conductive and a portion 71 which is conductive and similarly in the semicircular segment 49, the portion 72 is non-conductive and the portion 73 is conductive. The wiper arms 51, 52 are provided with brushes 80, 81, respectively, which slide on the corresponding segments 46 and 49.

The terminal 82 of the segment 46 is connected through a battery 83 to an input lead 84 of a relay 85 and the brush of the wiper arm 80 is connected to the other input lead 84 of the relay 85. Thus when the brush 80 is in contact with the portion 71 of the segment 46, the relay is energized. The relay 85 controls the valves 90 and 91, and whenever the relay becomes energized it closes the valve 90 and opens the valve 91. Similarly, the terminal 93 of the segment 49 is connected through a battery 94 to an input lead 95 of a relay 96 and the brush 81 of the wiper arm 52 is connected to the other lead of the relay 96. Thus when the brush 81 is in contact with the portion 73 of the segment 49, the relay 96 is energized. The relay 96 controls the valves 91 and 92 and whenever this relay becomes energized, it closes the valve 91 and opens the valve 92.

Assume now normal operating condition: The brushes 80 and 81 of the two rotatory switches do not contact the corresponding conductive segments 46 and 49. Consequently, the relays 85 and 96 are not energized. The valves 91 and 92 are closed and valve 90 is open, thus permitting the passage of a given petroleum product from the pipeline 10 to the pipeline 100. At a certain time a different petroleum product is introduced into the pipeline at the transmitting station 20. The pump 12 discharges this product from its compression side into the pipeline and forces it through the line. A radioactive tracer is injected by means of the injector 15 into the interface between these two products. As the products are transported through the pipeline, they carry with them the interface into which the radioactive tracer material has been injected. The adjacent products intermix across the interface during their flow, and the tracer material is carried both ahead of and behind the original plane of the interface. When the tracer was first injected, it was concentrated in a narrow band and the detection instruments showed its passage as a wave of high intensity and very short duration. As it traveled along the pipe, the tracer material spreads into the adjacent liquid on both sides of the interface so that subsequent observations show a continuously broader wave form of smaller amplitude.

It is thus apparent that as a result of diffusion of both petroleum products through the interface we obtain an intermixed region of both products and it is desired to divert for special processing this intermixed region. My invention consists essentially in detecting the arrival of the intermixed region and energizing the relay 85 upon such arrival. Thus the valve 90 is closed and the opening of the valve 91 diverts the intermixed region into the pipeline 101 for special processing. After the intermixed region has been thus diverted, relay 96 is energized. This closes the valve 91 and opens the valve 92, thus permitting the following petroleum product to be diverted into the pipeline 103.

In order to effect the appropriate controls indicated above, it is necessary to determine at the terminal station 21 the total amount of radioactivity that is associated with the intermixed region and this determination should be made prior to the arrival of the intermixed region at the terminal station 21.

To accomplish this, the auxiliary detector station 22 is placed at the pipeline at a position upstream at the distance from the terminal station 21 that is greater than the length of the intermixed region between adjacent products. The impulses from the counter 23 at the auxiliary station 22 are transmitted by means of leads 30 to the terminal station 21 wherein they actuate the count totalizer 33 and the electro-mechanical transducer 31. Thus after the intermixed region has passed through the auxiliary station 22 and before it arrived at the terminal station 21, the shaft 32 has performed a certain number of revolutions that represents the total radioactivity of the intermixed region. This radioactivity is also indicated on the count totalizer 33. Furthermore, the shaft 42 has effected an angular displacement of the circular segment 46 around the point 47 and the shaft 43 has effected an angular displacement of the circular segment 49 around the point 50, the amounts of said angular displacements depending upon the setting of gear boxes 40 and 41, respectively. At this time, the wiper arms 51 and 52 are aligned along the dashed lines 110 and 111, respectively. Consequently, the brushes 80 and 49 are out of contact with the conductive segments 71 and 73 and, as stated hereinabove, the relays 85 and 96 are de-energized and consequently the valve 90 is open while the valves 91 and 92 are closed, thus permitting the flow of the petroleum product from the pipeline 10 to the pipeline 100.

A short time thereafter, the intermixed region arrives at the terminal station 21 and because of the presence of the radioactive tracer in this region, pulses appear across the output leads of the Geiger counter 60. These pulses actuate the count totalizer 112 and produce rotation of the shaft 53 and of the wiper arms 51 and 52 in clockwise direction. It is apparent that the amount indicated on the count totalizer 112 and the angular displacement of the wiper arms 51 and 52 progresses as the intermixed region flows through the pipe-line at the terminal station 21.

The amount indicated on the count totalizer 33 assists the operator in determining the times at which the relays 85 and 96 should be closed. Assume, for instance, that the totalizer 33 indicates 100. Then the relay 85 may be energized when the index of the count totalizer 112 reaches a determined value such as 10, and the relay 96 may be energized when the count totalizer 112 reaches another predetermined value such as 90. If, on the other hand, the total activity of the intermixed region is not 100, but 200, in order to insure the same control of the valves, the relay 85 should be energized when the count totalizer reaches the value 20, and the relay 96 should be energized when the count totalizer reaches the value 180. It is apparent then in such an arrangement 10% of the intermixed region is diverted through the pipe 100, 80% is diverted through the pipe 101, and 10% is diverted through the pipe 103.

It is further apparent that the above valve control can be made automatic. This can be accomplished by effecting proper angular displacements of the circular segments 46 and 49 prior to the arrival of the intermixed region at the receiving station. Thus, when the total count indicated on the totalizer is 100 and the totalizer 112 indicates 10, then the wiper 80 establishes an electrical contact with the conductive segment 71, thereby energizing the relay 85, thus closing the valve 90 and opening the valve 91. Subsequently, when the totalizer 112 indicates 90, then the wiper 81 establishes an electrical contact with the conductive segment 73, thereby energizing the relay 96, thus closing valve 91 and opening the valve 92.

It is apparent that I have provided a method for determining the point of beginning or of the end of the intermixed region in order to make a proper cut. When shipments are made of adjacent quantities of like products with an interface between them, the cut will be made at the center of the intermixed region. In such event, an appropriate valve control is effected when the count totalizer 112 indicates a value equal to the half of the value shown by the count totalizer 33.

By employing this method, the radioactive tracer data can be used to cut into the interface region at the optimum time to hold the products within allowable limits of purity. In those cases where it is desired to separate the intermixed region from both products and divert it for special processing, the described method enables the quantity thus diverted to be held to a minimum.

It is apparent that the radioactive tracer method described herein enables a pipeline operation to be carried out more economically and effeciently than the methods normally used heretofore. Not only does it result in an increase in the usable quantities of individual products that can be diverted from a common pipeline, with a concomitant decrease in downgrading or reworking of products, but also it relieves the station operator from necessity of spending much time sampling the products flowing through the line to catch the interface and determine the proper point for diversion of the various components of the stream.

It is also apparent that I can use the above arrangement to indicate the presence of a leak in the pipeline 10 between the pumping station 20 and the terminal station 21. In order to accomplish this, I provide at the pumping station across the output terminals of the amplifier 17 a count totalizer 150, thus providing an index of the amount of radioactivity that has been injected in the pipeline. In order to simplify the problem, we assume that the half-life of the radioactive tracer is very long when compared to the time of travel of the interface from the station 20 to the station 21. Under these conditions, in the absence of leak, the value shown on the totalizer 112 after the passage of the intermixed region should be the same as the value shown on the totalizer 150. If the value shown by the totalizer 112 is smaller than the corresponding value on the totalizer 150, then it is apparent that a certain amount of the tracer has been removed from the pipeline, thus indicating the presence of a leak.

What I claim as new and desire to secure by Letters Patent of the United States is:

1. In a system for operating a pipeline in which a multiplicity of fluid substances in sequential adjacent relationship are transported from a transmitting station to a receiving station, comprising means at said transmitting station for interspersing a radioactive material between adjacent substances at said transmitting station, a second radiation detector at said receiving station and a first radiation detector between said transmitting station and said receiving station, means actuated by said first radiation detector for producing a signal representing the total amount of radioactivity detected by said first detector, means for integrating the output of said second detector, and a distributing means responsive to said signal and to said integrating means for diverting said substances from said pipeline at times at which the output of said integrating means reached a value having a determined relationship to the value of said signal.

2. In a system for operating a pipeline in which a multiplicity of fluid substances in sequential adjacent relationship are transported from a transmitting station to a receiving station, the combination which comprises means at said transmitting station for injecting a radioactive material between adjacent substances in said pipeline, a first radiation detector disposed at a position along said pipeline intermediate said transmitting station and said receiving station, a second radiation detector situated at said receiving station, integrating means fed by said first detector for generating an indication of the total radioactivity detected by said first detector, said integrating means including an element capable of a continuous change of state through a predetermined range, said element being operative responsively to detection of radiation by said first detector to change its said state progressively to a degree proportional to the total of radiation detected by said first detector, second integrating means fed by said second detector and operative to generate an indication of the total radioactivity detected by said second detector, said second integrating means also having an element capable of a continuous change of state through a predetermined range, said element being operative responsively to detection of radiation by said second detector to change its said state progressively to a degree proportional to the total of radiation detected by said second detector, a plurality of fluid channels at said receiving station connected to said pipeline and capable of receiving products therefrom, a valve for each of said channels, and control means for said valves comprising a sensing means for comparing the relative states of said first and second elements in said respective integrating means, said control means being operative to open and close said valves in accordance with a predetermined pattern responsively to the changing relative states of said first and second elements.

3. The combination defined in claim 2 wherein each of said elements comprises an electrically conductive contact member, and wherein said contact members engage at predetermined relative states of said first and second elements, thereby actuating said valve-control means in accordance with said predetermined pattern.

4. In a system for operating a pipeline in which a multiplicity of fluid substances in sequential adjacent relationship are transported from a transmitting station to a receiving station, the combination which comprises means at said transmitting station for injecting a radioactive material between adjacent substances in said pipeline, a first radiation detector disposed at a position along said pipeline intermediate said transmitting station and said receiving station, a second radiation detector situated at said receiving station, integrating means fed by said first detector for generating an indication of the total radioactivity detected by said first detector, said integrating means comprising a pair of elements capable of continuous change of state through a predetermined range, said elements being operative responsively to detection of radiation by said first detector to change their said states progressively to a degree proportional to the total of radiation detected by said first detector, second integrating means fed by said second detector for generating an indication of the total radioactivity detected by said second detector, said second integrating means also comprising a pair of elements capable of a continuous change of state through a predetermined range, said elements being operative responsively to detection of radiation by said second detector to change their said states progressively to a degree proportional to the total of radiation detected by said second detector, a plurality of fluid channels at said receiving station connected to said pipeline and capable of receiving products therefrom, a valve for each of said channels, and control means for said valves comprising sensing means for comparing the relative states of one of the elements of said first integrating means and a corresponding element of said second integrating means for actuating at least one of said valves when said relative states attain a predetermined condition and for comparing the relative states of the other of said elements of said first and second integrating means for operating at least one other of said valves when said last-mentioned relative states attain a predetermined condition.

5. The apparatus defined in claim 4 wherein said changes of state constitute physical movement and said sensing means comprise electrical contact members respectively carried by each of said elements of said first and second integrating means.

References Cited in the file of this patent

UNITED STATES PATENTS

| 2,706,254 | Mithoff et al. | Apr. 12, 1955 |
| 2,826,699 | Hull | Mar. 11, 1958 |
| 2,859,757 | Parsons | Nov. 11, 1958 |

OTHER REFERENCES

Radioisotopes in Petroleum Refining, Research, and Analysis, by Hull and Frus, a paper presented to the Geneva Conference in August 1955, printed in Peaceful Uses of Atomic Energy, vol. 15, pages 199–203.